US008218820B2

(12) United States Patent
Hayashi et al.

(10) Patent No.: US 8,218,820 B2
(45) Date of Patent: Jul. 10, 2012

(54) IMAGE PROCESSING METHOD, RECORDING MEDIUM CARRYING IMAGE PROCESSING PROGRAM, AND IMAGE PROCESSING APPARATUS

(75) Inventors: Kazunori Hayashi, Tokyo (JP); Itaru Kawakami, Kanagawa (JP); Yoichiro Sako, Tokyo (JP); Takayasu Kon, Tokyo (JP); Yasunori Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 12/366,044

(22) Filed: Feb. 5, 2009

(65) Prior Publication Data

US 2009/0208128 A1 Aug. 20, 2009

(30) Foreign Application Priority Data

Feb. 15, 2008 (JP) ................................. 2008-034235

(51) Int. Cl.
*G06K 9/00* (2006.01)
(52) U.S. Cl. .......................... 382/104; 382/256; 382/266
(58) Field of Classification Search .................. 382/296, 382/295, 151, 290, 154, 256, 266; 348/208.4, 348/208.3, 208.99, 154, 155; 396/52, 54, 396/55
See application file for complete search history.

(56) References Cited

U.S. PATENT DOCUMENTS

| 6,778,699 | B1 | 8/2004 | Gallagher | |
|---|---|---|---|---|
| 6,968,094 | B1* | 11/2005 | Gallagher | 382/296 |
| 7,502,050 | B2* | 3/2009 | Hatanaka et al. | 348/208.3 |
| 7,623,153 | B2* | 11/2009 | Hatanaka | 348/208.3 |
| 7,773,118 | B2* | 8/2010 | Florea et al. | 348/208.99 |
| 7,893,963 | B2* | 2/2011 | Gallagher et al. | 348/208.6 |
| 2002/0036692 | A1 | 3/2002 | Okada | |
| 2005/0036673 | A1* | 2/2005 | Ohba et al. | 382/154 |
| 2006/0044404 | A1* | 3/2006 | Hatanaka | 348/208.4 |
| 2006/0244749 | A1 | 11/2006 | Kondo et al. | |

FOREIGN PATENT DOCUMENTS

| CN | 1855150 A | 11/2006 |
|---|---|---|
| EP | 1631062 | * 8/2004 |
| EP | 1631062 A2 | 3/2006 |
| JP | 03-238566 A | 10/1991 |
| JP | 2000-272415 A | 10/2000 |
| JP | 2002-112252 A | 4/2002 |
| JP | 2003-250117 | 9/2003 |
| JP | 2004-205398 A | 7/2004 |
| JP | 2006-245909 A | 9/2006 |

OTHER PUBLICATIONS

Mobile Robot Navigation by Visual Sign Patterns Existing in Outdoor Environment; ishiguro et al Jul. 1992.*

(Continued)

*Primary Examiner* — Vikkram Bali
*Assistant Examiner* — Nancy Bitar
(74) *Attorney, Agent, or Firm* — Wolf, Greenfield & Sacks, P.C.

(57) ABSTRACT

An image processing method includes the steps of extracting edges from each of a plurality of original images, thereby obtaining edge images; extracting straight lines from the edge images, thereby obtaining line images; assuming extensions of the straight lines constituting the line images and setting vanishing points on the basis of the extensions; and trimming the plurality of original images so that positions of the vanishing points in the respective original images mutually match, thereby obtaining final images.

7 Claims, 7 Drawing Sheets

11

12

OTHER PUBLICATIONS

Herranz et al., Adapting surveillance video to small displays via object-based cropping. 8th International Workshop on Image Analysis for Multimedia Interactive Services. Jun. 1, 2007:72.

Ishiguro et al., Mobile robot navigation by visual sign patterns existing in outdoor environment. Proceedings of the IEEE/RSJ International Conference on Intelligent Robots and Systems. Raleigh, NC. Jul. 7, 1992;1:636-41.

Liang et al., Video stabilization for a camcorder mounted on a moving vehicle. IEEE Transactions on Vehicular Technology. Nov. 1, 2004;53(6):1636-48.

Lutton et al., Contribution to the determination of vanishing points using hough transform. IEEE Transactions on Pattern Analysis and Machine Intelligence. Apr. 1, 1994;16(4):430-8.

Wang et al., Driver assistance system for lane detection and vehicle recognition with night vision. IEEE/RSJ International Conference. Edmonton, AB, CA. Intelligent Robots and Systems. Aug. 2, 2005:3314-9.

Zhang et al., A novel face recognition system using hybrid neural and dual eigenspaces methods. IEEE Transaction on Systems, Man, and Cybernetics—Part A: Systems and Humans. Nov. 1, 2002;32(6):787-93.

Chinese Office Action issued Feb. 22, 2012 in connection with Chinese Application No. 200910007643.8.

* cited by examiner

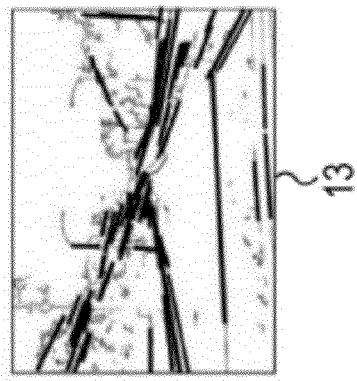
FIG. 1B
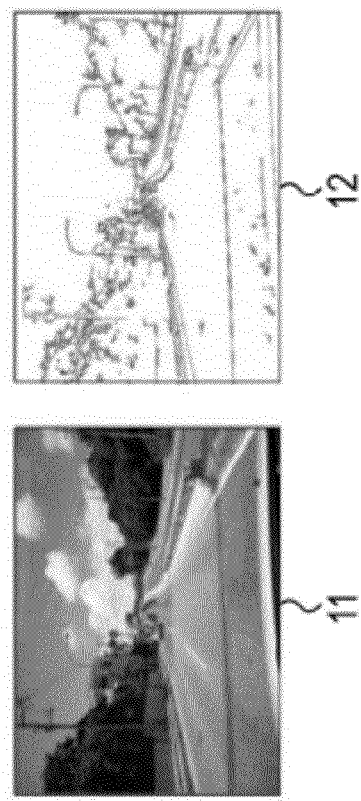
FIG. 1A
FIG. 1D
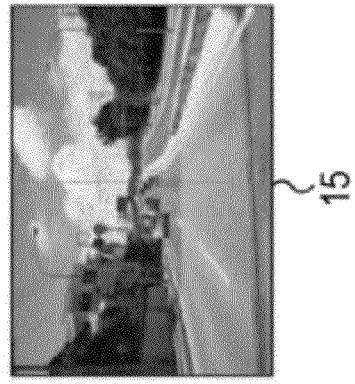
FIG. 1C
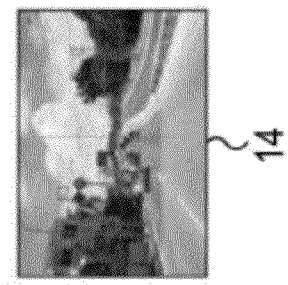
FIG. 1E
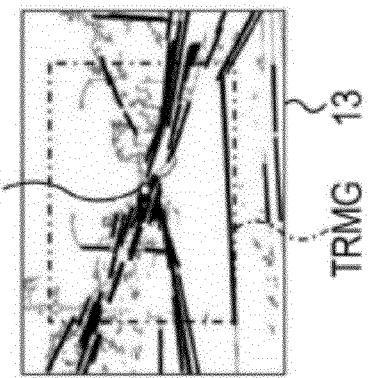
FIG. 1F

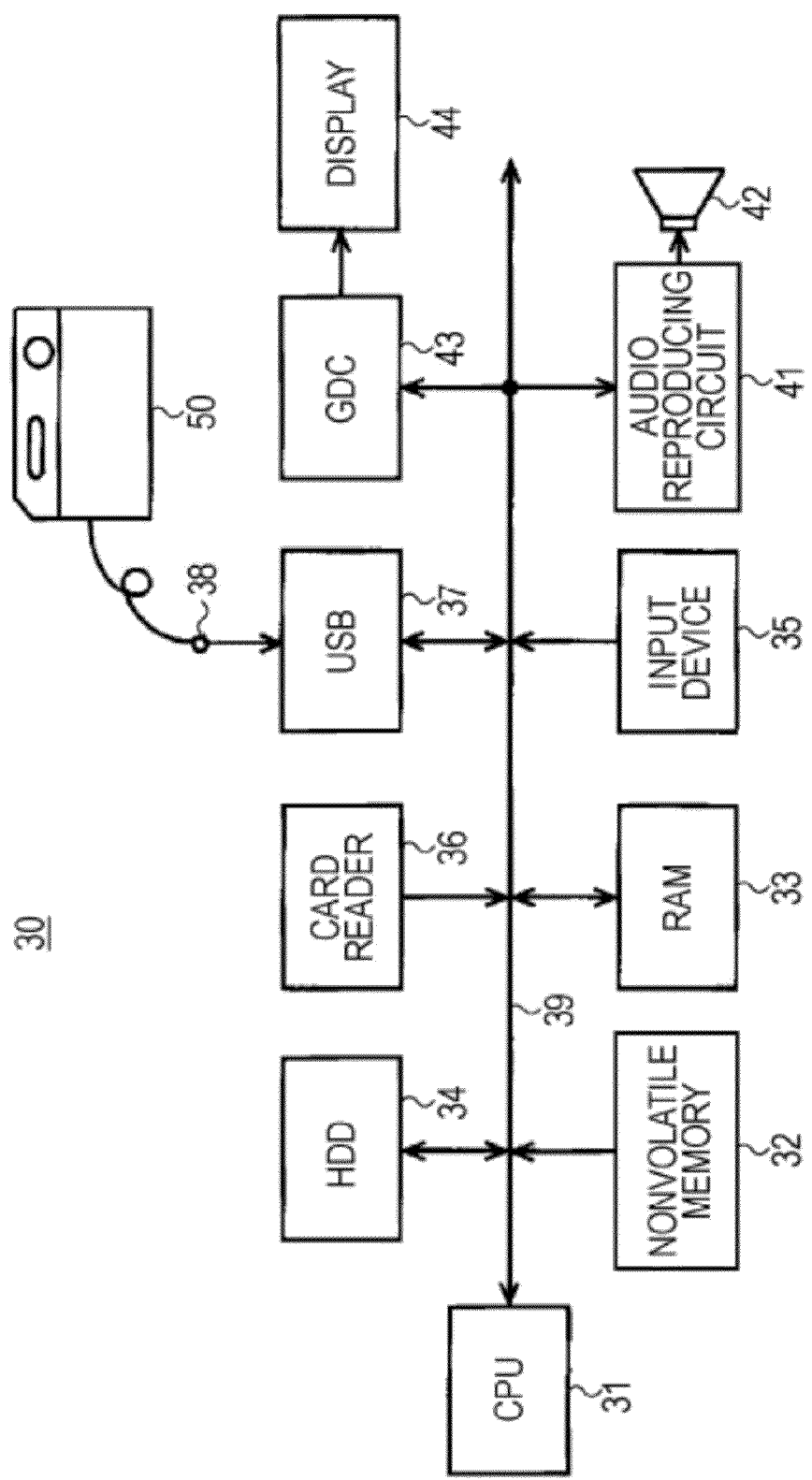

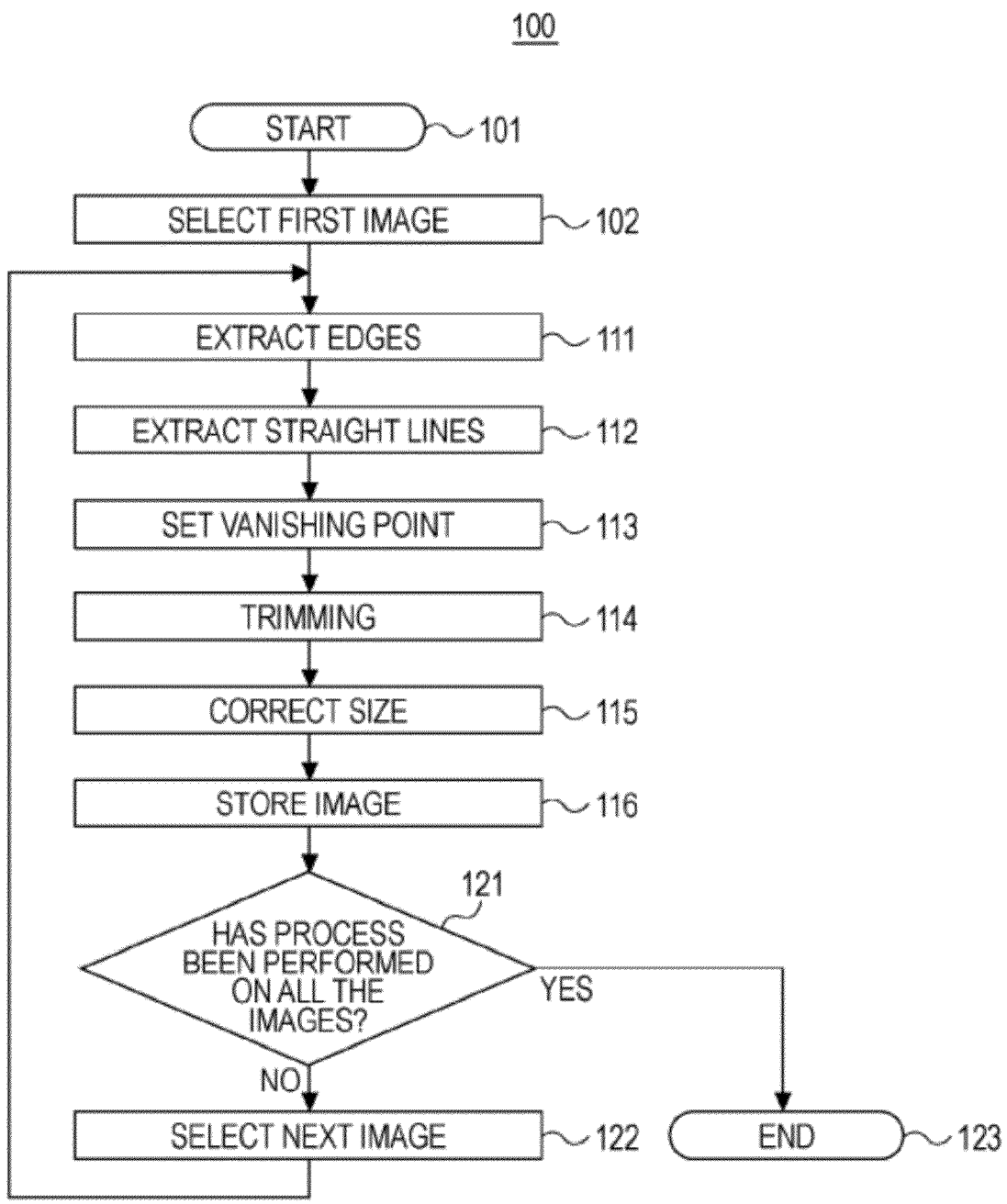

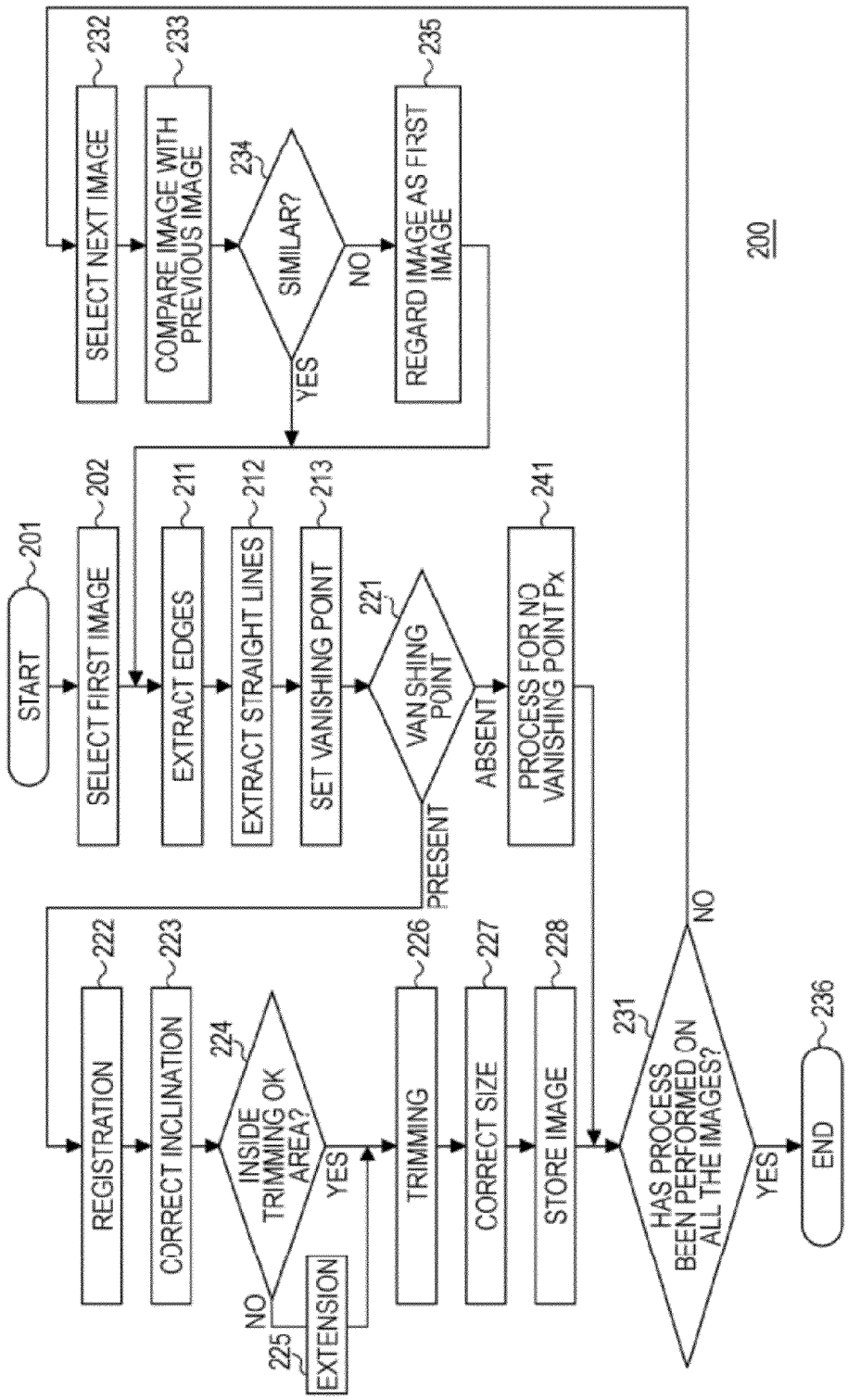

IMAGE PROCESSING METHOD, RECORDING MEDIUM CARRYING IMAGE PROCESSING PROGRAM, AND IMAGE PROCESSING APPARATUS

CROSS REFERENCES TO RELATED APPLICATIONS

The present invention contains subject matter related to Japanese Patent Application JP 2008-034235 filed in the Japanese Patent Office on Feb. 15, 2008, the entire contents of which are incorporated herein by reference.

BACKGROUND OF THE INVENTION

1. Field of the Invention

The present invention relates to an image processing method, a recording medium carrying an image processing program, and an image processing apparatus.

2. Description of the Related Art

FIGS. 7A to 7H illustrate an example of images automatically captured by a digital still camera hung near a passenger's seat of a vehicle at intervals of 10 seconds, for example, in a traveling direction. Those images are still images captured by intermittent shooting and have continuity in the content. Thus, if the images are sequentially reproduced at short time intervals, e.g., at time intervals of 0.8 seconds, the images can be seen as if they are flipped through, and a series of motions or changes in scenery can be read although the motions are not smooth.

Hereinafter, the above-described method for sequentially reproducing images captured at predetermined time intervals at short time intervals is called "slide-show reproducing".

For example, if a user performs intermittent shooting while hanging a digital still camera on his/her neck during sightseeing and if the captured images are reproduced in a slide show, things and situations seen by the user during the sightseeing can be realistically reproduced.

A related-art document includes Patent Document 1: Japanese Unexamined Patent Application Publication No. 2003-250117.

SUMMARY OF THE INVENTION

However, if the digital still camera is significantly shaken during shooting, the direction of an optical axis of the digital still camera significantly changes in accordance with the shake. For this reason, as illustrated in FIGS. 7A to 7H, the area occupied by the sky (the position of the horizon) randomly changes in the respective images illustrated in FIGS. 7A to 7H. That is, the position of a main subject and an entire composition significantly vary in each image.

If such images are reproduced in a slide show, the position of a main subject and an entire composition significantly vary in an upward/downward or right/left direction in each image, although the images have similar content or the content gradually changes. This is not eye-friendly and may cause the user to have feeling of fatigue or sickness like motion sickness.

This is the same in moving images. If a main subject and an entire composition vary in an upward/downward or right/left direction in each frame during reproducing, those moving images are not eye-friendly and may cause feeling of fatigue or sickness.

According to an embodiment of the present invention, there is provided an image processing method including the steps of extracting edges from each of a plurality of original images, thereby obtaining edge images; extracting straight lines from the edge images, thereby obtaining line images; assuming extensions of the straight lines constituting the line images and setting vanishing points on the basis of the extensions; and trimming the plurality of original images so that positions of the vanishing points in the respective original images mutually match, thereby obtaining final images.

With this configuration, significant variations of a main subject and an entire composition in each image can be prevented in slide-show reproducing, which is eye-friendly and prevents feeling of fatigue or sickness like motion sickness.

BRIEF DESCRIPTION OF THE DRAWINGS

FIGS. 1A to 1F illustrate an outline of a process according to an embodiment of the present invention;

FIG. 4 is a system diagram illustrating an embodiment of the present invention;

FIG. 5 is a flowchart illustrating an embodiment of the present invention;

FIG. 6 is a flowchart illustrating another embodiment of the present invention.

DESCRIPTION OF THE PREFERRED EMBODIMENTS

Figure 2B:
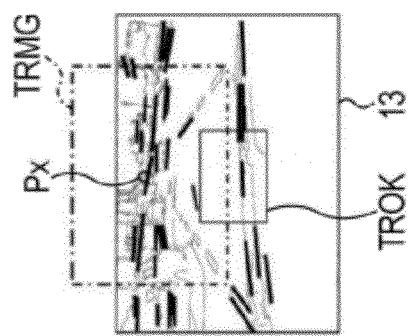
FIGS. 2A to 2D illustrate the outline of the process according to the embodiment of the present invention.

<1> Outline of Embodiment of the Present Invention

FIGS. 1A to 1F illustrate an outline of image processing according to an embodiment of the present invention. Referring to FIG. 1A, reference numeral 11 denotes one of original images captured by intermittent shooting by a digital still camera. More specifically, the original image 11 is one of images automatically captured by the digital still camera hung near a passenger's seat of a vehicle at intervals of 10 seconds, for example, in a traveling direction as described above.

Then, an edge extracting process is performed on the original image 11, so that an edge image 12 illustrated in FIG. 1B is obtained. Then, straight lines are extracted from the edge image 12, so that a line image 13 illustrated in FIG. 1C is obtained. Among the straight lines constituting the line image 13, some straight lines can be regarded as part of straight lines radially extending from the point at infinity (vanishing point) in perspective drawing.

On the basis of this concept, extensions are assumed for all the straight lines constituting the line image 13 as illustrated in FIG. 1D, and a point Px where the largest number of extensions converge or cross is set as a vanishing point.

After the vanishing point Px has been set, the original image 11 is trimmed so that the vanishing point Px is included in a frame (final image), whereby a trimmed image 14 illustrated in FIG. 1E is formed. In this case, the range of trimming is set so that the vanishing point Px is positioned at the center of the frame and that the area of the range is 50% of the area of the original image 11, for example, as indicated by a chain line TRMG in FIG. 1D.

Then, the trimmed image 14 is scaled up into an image 15 having the same size as that of the original image 11, as illustrated in FIG. 1F, and the image 15 is stored as a final corrected image. The above-described process is performed on all the images that are to be reproduced in a slide show.

With the above-described process, significant variations of a main subject and an entire composition in each image do not occur during slide-show reproducing, as illustrated in FIGS. 7A to 7H. Accordingly, eye-friendly and less fatiguing slide-show reproducing can be provided.

<2> Form More Appropriate Images

In the case where more appropriate slide-show reproducing is to be realized, the following correcting process should desirably be performed in the above-described process <1>.

<2-1> Set Trimming Area

For example, in the original image 11 illustrated in FIG. 1A, the range defined by the chain line TRMG in FIG. 1D is set as a trimming area (the range effective in trimming) and becomes the final corrected image 15. However, for example, if the digital still camera significantly shakes to cause the optical axis thereof to be directed obliquely downward during shooting, whereby the original image 11 illustrated in FIG. 2A is captured, the trimming area TRMG lies off the upper edge of the line image 13 of the image 11, as illustrated in FIG. 2B.

Figure 2D:
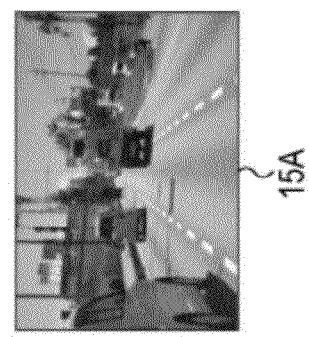
Figure 2A:
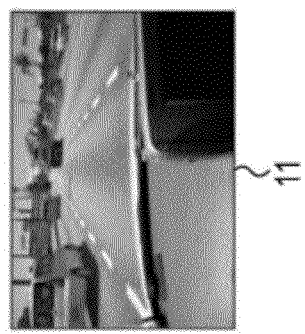
Figure 2C:
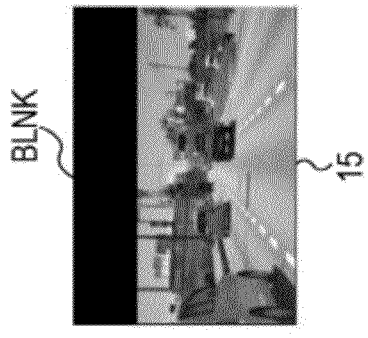
Figure 3A:
FIGS. 3A to 3H illustrate an advantage of the embodiment of the present invention.
Figure 3B:
Figure 3C:
Figure 3D:
Figure 3E:
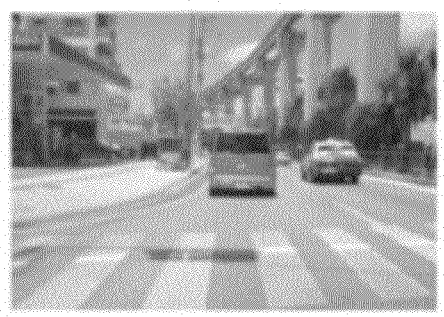
Figure 3F:
Figure 3G:
Figure 3H:
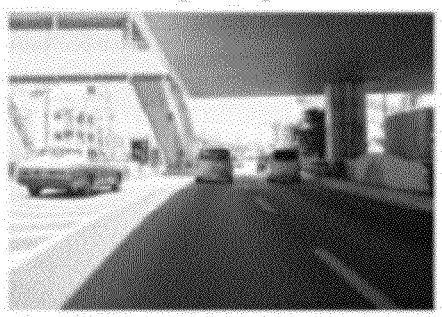
Figure 7A:
FIGS. 7A to 7H illustrate a related art.
Figure 7B:
Figure 7C:
Figure 7D:
Figure 7E:
Figure 7F:
Figure 7G:
Figure 7H:

In such a case, the final corrected image 15 has a blank area (non-image area) BLNK at the upper side as illustrated in FIG. 2C. The blank area BLNK is displayed in black during slide-show reproducing, which is undesirable.

In the example illustrated in FIGS. 2A to 2D, if the blank area BLNK occurs as illustrated in FIG. 2C, the entire corrected image 15 is extended upward to fill the blank area BLNK, thereby being corrected to an image 15A as illustrated in FIG. 2D.

Accordingly, the blank area BLNK does not appear in slide-show reproducing. The corrected image 15A is obtained by vertically extending the image 15. The content of the corrected image 15A is continuous to the previous and subsequent images and the image 15A is displayed for only a moment (e.g., for 0.8 seconds) during slide-show reproducing, which does not cause a user to feel unnaturalness.

In order to detect whether the trimming area TRMG lies off the line image 13 (image 11) as illustrated in FIG. 2B, a trimming OK area TROK is set in the line image 13. That is, the trimming OK area TROK is set so that the vanishing point Px is positioned inside the trimming OK area TROK when the trimming area TRMG does not lie off the line image 13 (image 11) and that the vanishing point Px is positioned outside the trimming OK area TROK when the trimming area TRMG lies off the line image 13 (image 11).

In this way, the presence or absence, the direction (position), and the size of the blank area BLNK can be detected on the basis of the position of the vanishing point Px with respect to the trimming OK area TROK, and the corrected image 15A illustrated in FIG. 2D can be obtained from the detection result.

<2-2> Correct Trimming Angle

The above-described <2-1> is applied to the case where the digital still camera is horizontally hung near a passenger's seat of a vehicle or on the neck of a user in a proper way. Actually, however, the digital still camera may temporarily incline to the right or left during running of the vehicle or walking of the user. In such a case, images captured at that time also incline and thus are not eye-friendly when being reproduced in a slide show.

In this case, the following process is performed after respective vanishing points Px and Px are set in two sequential images (n−1) and n.

(1) The image n is shifted so that the vanishing point Px of the image n matches the vanishing point Px of the image (n−1).

(2) The image n is rotated about the vanishing point Px so that the extensions giving the vanishing point Px in the image n match the extensions giving the vanishing point Px in the image (n−1).

(3) Then, the trimming process from <2-1> is performed.

With this process, a final image does not incline even if the digital still camera temporarily inclines to the right or left, so that eye-friendly slide-show reproducing can be performed.

<3> Result of Process

FIGS. 3A to 3H illustrate a result obtained by performing the above-described processes <1> and <2> on the images illustrated in FIGS. 7A to 7H. FIGS. 3A to 3H correspond to FIGS. 7A to 7H, respectively. According to FIGS. 3A to 3H, the content of images changes in accordance with the shooting intervals, but the position of a main subject and an entire composition are stable compared to those in the unprocessed images (FIGS. 7A to 7H). Therefore, if those images are reproduced in a slide show, the images can be easily seen and the viewer does not feel fatigue.

<4> Configuration of Apparatus

The above-described processes <1> and <2> can be realized by dedicated hardware. Hereinafter, a description is given about the case where the processes <1> and <2> are realized by a personal computer.

With reference to FIG. 4, a personal computer 30 includes a CPU (central processing unit) 31 to execute various programs, a nonvolatile memory 32 to store an initial program loader, a RAM (random access memory) 33 serving as a work area, and an HDD (hard disk drive) 34 serving as a high-capacity storage device. The nonvolatile memory 32, the RAM 33, and the HDD 34 connect to the CPU 31 through a system bus 39.

In this case, an OS (operating system) and various application programs are provided in the HDD 34, and also a routine 100 illustrated in FIG. 5 is provided as part of the application programs. The routine 100, the details thereof being described below, is for realizing the above-described process <1>. FIG. 5 illustrates only the part related to an embodiment of the present invention. Assume that the application program corresponding to the routine 100 is provided via a recording medium such as a CD-ROM (compact disc-read only memory) carrying the application program, is read by a reader (not illustrated), and is stored in the HDD 34. Alternatively, the application program may be transmitted through the Internet and stored in the HDD 34.

Furthermore, the original images (image data of the original images) illustrated in FIGS. 7A to 7H are provided in the HDD 34, and the corrected images (final images) illustrated in FIGS. 3A to 3H are stored therein after execution of the routine 100.

Also, an input device 35, a card reader 36, and an USB (universal serial bus) port 37 connect to the system bus 39. In this case, the input device 35, such as a keyboard and a mouse, is operated by a user to input instructions or data, and the card reader 36 is used to access data in an external memory card (not illustrated) when the memory card is inserted. Furthermore, the USB port 37 is used to access data in an external USB device when the USB device is connected to a USB connector 38.

In FIG. 4, a digital still camera 50 is connected to the USB connector 38, and images captured by the digital still camera 50, that is, original images to be corrected in the process <1>, are taken in. Note that, if the digital still camera 50 stores captured images in a memory card (not illustrated) included therein and if the memory card can be removed from the digital still camera 50, the original images captured by the digital still camera 50 can be taken in by setting the memory card to the card reader 36.

The original images taken in from the digital still camera 50 are stored in the HDD 34 and are corrected to the images as illustrated in FIGS. 3A to 3H when the routine 100 is executed.

Furthermore, the personal computer 30 includes an audio reproducing circuit 41 and a display control circuit (GDC: graphic display controller) 43, which connect to the system bus 39. The audio reproducing circuit 41 performs a decoding process based on MP3 (MPEG (Motion Picture Experts Group)-1/audio layer 3) or the like as necessary when being supplied with digital audio data, D/A (digital to analog)—converts the digital audio data to analog audio signals, and supplies the analog audio signals to a speaker 42.

The display control circuit 43 includes a video RAM (not illustrated). Data to be displayed is supplied to the video RAM and is repeatedly read at predetermined intervals so as to be converted to video signals. Then, the video signals are supplied to a display 44 and images are displayed thereon.

<5> Operation of Apparatus

Now, the operation and process in the personal computer 30 illustrated in FIG. 4 are described with reference to FIGS. 1A to 2D.

<5-1>Operation of Performing Only Correction in Process <1>

In this case, after the power of the personal computer 30 has been turned on, the initial program loader in the nonvolatile memory 32 is executed by the CPU 31, and the OS is read from the HDD 34 and is executed after being transferred to the RAM 33, so that wait for execution of the application program occurs. Then, if instructions to execute the routine 100 are provided through an operation of the input device 35, the routine 100 is read from the HDD 34 and is transferred to the RAM 33, so that the execution of the routine 100 is started.

In the routine 100, the process is started from step 101 by the CPU 31. Then, in step 102, a first image among the original images stored in the HDD 34, that is, the original image 11 (FIG. 1A), is selected to be processed. In step 111, edge extraction is performed on the target image 11.

As a method for the edge extraction in step 111, the method described in J. Canny: "A Computational Approach to Edge Detection", IEEE Transactions on Patten Analysis and Machine Intelligence, Vol. 8, No. 6, November 1986 can be used, for example.

Then, in step 112, straight lines are extracted from the edge image 12 formed in step 111 and the line image 13 (FIG. 1C) is formed. As a method for extracting straight lines from the edge image 12 and obtaining the line image 13, a line extraction method based on Hough transformation may be adopted. The Hough transformation is described in P.V.C. Hough, "Method and means for recognizing complex patterns", U.S. Pat. No. 3,069,654, 1962, or Duda, R. O. and P. E. Hart, "Use of the Hough Transformation to detect Lines and Curves in Pictures", Comm. ACM, Vol. 15, pp. 11-15 (January, 1972).

Then, in step 113, the point Px where the largest number of extensions of the straight lines in the line image 13 converge or cross is set as a vanishing point (FIG. 1D).

Then, in step 114, the original image 11 is trimmed so that the range TRMG in FIG. 1D is an effective range (FIG. 1E). That is, the image 11 is trimmed so that the vanishing point Px is positioned at the center of the frame (final corrected image 15) and that the area of the range is 50% of that of the original image 11, whereby the image 14 is formed.

Then, in step 115, the trimmed image 14 formed in step 114 is scaled up to the size same as that of the original image 11, so that the final corrected image 15 is formed (FIG. 1F). In step 116, the corrected image 15 is stored in the HDD 34.

In step 121, it is determined whether the above-described correcting process has been performed on all the images (all the images to be corrected) in the HDD 34. If an uncorrected image remains, the process proceeds from step 121 to step 122. In step 122, a next uncorrected image is selected and the process returns to step 111. Then, the uncorrected image selected in step 122 is also corrected in the above-described manner.

After the above-described correcting process has been performed on all the images stored in the HDD 34, the completion is determined in step 121, and the process proceeds from step 121 to step 123. The routine 100 ends in step 123.

As described above, the routine 100 realizes the correcting process <1>. Accordingly, significant variations of a main subject and an entire composition in each image can be prevented during slide-show reproducing, so that eye-friendly and less fatiguing slide-show reproducing can be provided.

<5-2> Operation of Performing Also Formation of More Appropriate Images in Process <2>

In this case, a routine 200 illustrated in FIG. 6 is provided instead of the routine 100 in the HDD 34, and the routine 200 is executed by the CPU 31. Here, assume that the application program based on the routine 200 is provided via a recording medium such as a CD-ROM carrying the application program, is read by a reader (not illustrated), and is stored in the HDD 34. Alternatively, the application program may be transmitted through the Internet and stored in the HDD 34.

In the routine 200, the process is started from step 201 by the CPU 31. Then, in step 202, a first image among the original images stored in the HDD 34, that is, the original image 11 (FIG. 1A), is selected to be processed. In step 211, edge extraction is performed on the target image 11, so that the edge image 12 (FIG. 1B) is formed.

Then, in step 212, straight lines are extracted from the edge image 12 formed in step 211 and the line image 13 (FIG. 1C) is formed. Then, in step 213, the point Px where the largest number of extensions of the straight lines in the line image 13 converge or cross is set as a vanishing point (FIG. 1D).

Then, in step 221, whether the vanishing point Px was set in step 213 (presence/absence of the vanishing point Px) is determined. If it is determined that the vanishing point Px was set, the process proceeds from step 221 to step 222. In step 222, the above-described process (1) is performed, whereby the image n is shifted so that the vanishing point Px in the image n matches the vanishing point Px in the image (n−1). Then, in step 223, the above-described process (2) is performed, whereby the image n is rotated about the vanishing point Px so that the extensions giving the vanishing point Px in the image n match the extensions giving the vanishing point Px in the image (n−1).

The previous image (n−1) is temporarily stored in the RAM 33 for steps 222 and 223. When the first image (n=1) is processed, a reference image n=0 does not exist, and thus steps 222 and 223 are not performed.

Then, the process proceeds to step 224, where it is determined whether the vanishing point Px is positioned in the trimming OK area TROK (FIG. 2B). If the vanishing point Px is positioned in the trimming OK area TROK, the process proceeds from step 224 to step 226.

On the other hand, if the vanishing point Px is not positioned in the trimming OK area TROK, the process proceeds from step 224 to step 225, where the original image 11 is extended to cover the blank area BLNK as illustrated in FIGS. 2C and 2D. That is, the original image 11 is extended in the direction where the vanishing point Px deviates from the trimming OK area TROK by the deviation. Then, the process proceeds to step 226.

In step 226, the original image 11 (or the image extended in step 225) is trimmed so that the range TRMG illustrated in FIG. 1D is a trimming area (FIG. 1E). That is, the original image 11 is trimmed so that the vanishing point Px is positioned at the center of the frame (final corrected image 15) and that the area of the range is 50% of the area of the original image 11, whereby the image 14 is formed.

Then, in step 227, the trimmed image 14 formed in step 226 is scaled up to the same size as that of the original image 11 and the final corrected image 15 (or 15A) is formed (FIG. 1F or FIG. 2D). In step 228, the corrected image 15 is stored in the HDD 34.

Then, in step 231, it is determined whether the above-described correcting process has been performed on all the images (all the images to be corrected) in the HDD 34. If an uncorrected image remains, the process proceeds from step 231 to step 232. In step 232, a next uncorrected image is selected.

Then, in step 233, the image n selected in step 232 is compared with the previous image (n−1). In step 234, the similarity between the images n and (n−1) is determined. If the similarity has a predetermined value or more, it is determined that the images n and (n−1) are sequential sceneries and the process returns from step 234 to step 211. Then, the uncorrected image selected in step 232 is corrected in the above-described manner.

If the similarity between the images n and (n−1) has a value smaller than the predetermined value in step 234, it is determined that the images n and (n−1) are not sequential sceneries, and the process proceeds from step 234 to step 235. In step 235, the uncorrected image selected in step 232 is regarded as a first image as in step 202, and the process returns to step 211. Accordingly, step 211 and the subsequent steps are performed while the uncorrected image selected in step 232 being regarded as a first image, and correction is performed in the above-described manner.

Then, after the above-described correcting process has been performed on all the images stored in the HDD 34, the completion is determined in step 231, and the process proceeds from step 231 to step 236. In step 236, the routine 200 ends.

If the vanishing point Px is not set in step 221 (e.g., if only the horizon or a person exists in the image), the process proceeds from step 221 to step 241, where a process for no vanishing point Px is performed, and then the process proceeds to step 231.

As described above, the routine 200 can realize the process <2> for more appropriate images in addition to the correcting process <1>, so that more eye-friendly and less fatiguing slide-show reproducing can be provided.

<6> Conclusion

According to the above-described system, significant variations of a main subject and an entire composition in each image do not occur during slide-show reproducing, as illustrated in FIGS. 3A to 3H. Thus, the images are very eye-friendly and the viewer does not have feeling of fatigue or sickness like motion sickness.

Furthermore, even if the digital still camera temporarily inclines to the right or left, the final image does not incline and is eye-friendly when being reproduced in a slide show.

<7> Others

In the above-described embodiment, the original image 11 may be scaled down to a size (the number of dots) for easy process, the process <1> may be performed on the scaled-down image so as to set the trimming range TRMG, and the trimming range TRMG may be applied to the original image 11, so that the final corrected image 15 can be obtained.

In the above-described embodiment, the vanishing point Px is positioned at the center of the frame (final corrected image 15). However, the vanishing point Px is not necessarily positioned at the center of the frame, but the position of the vanishing point Px is fixed in sequential frames. For example, the position may be set by a user.

As described above, the above-described process is effective to images that change with correlation, and is thus more effective to moving images captured by a digital movie camera.

Furthermore, in the above-described embodiment, the trimmed image 14 is scaled up in step 227 in order to obtain the final corrected image 15 having the same size as that of the original image 11. Alternatively, the trimmed image 14 may be scaled up or down to the size set by a user, e.g., to the size having the number of dots equal to the number of dots of the display 44, so as to obtain the final corrected image 15.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing method comprising:
   extracting edges from each original image of a plurality of original images, thereby obtaining an edge image;
   extracting straight lines from the edge image, thereby obtaining line images;
   determining extensions of the straight lines of the line images and setting a vanishing point based at least in part on the extensions; and
   trimming each original image of the plurality of original images so that a position of the vanishing point of each original image of the plurality of original images matches with a position of a vanishing point of each other original image of the plurality of original images, thereby obtaining a final image corresponding to each original image.

2. The image processing method according to claim 1, further comprising:
   if a non-image area exists in the final image when the original image is trimmed so that the position of the vanishing point of each original image matches with the position of the vanishing point of each other original image, extending the original image to fill the non-image area.

3. The image processing method according to claim 1, wherein, when the original image is trimmed so that the position of the vanishing point of each original image matches with the position of the vanishing point of each other image, inclination of the original image is corrected so that the straight lines in the line images obtained from the original image match straight lines in line images obtained from each other original image of the plurality of original images.

4. The image processing method according to claim 1, wherein, when the final image is obtained by the trimming, the final image has a size based on the original image.

5. The image processing method according to claim 1, wherein the final image resulting from the trimming is stored in a storage device.

6. A computer-readable storage medium storing computer-executable instructions comprising an image processing program that, when executed by a computer, allow the computer to execute a method comprising:
   extracting edges from each original image of a plurality of original images, thereby obtaining an edge image;

extracting straight lines from the edge image, thereby obtaining line images;

determining extensions of the straight lines of the line images and setting a vanishing point based at least in part on the extensions; and trimming each original image of the plurality of original images so that a position of the vanishing point of each original image of the plurality of original images matches with a position of a vanishing point of each other original image of the plurality of original images, thereby obtaining a final image corresponding to each original image.

7. An image processing apparatus comprising:

an edge extracting circuit configured to extract edges from each original image of a plurality of original images, thereby obtaining an edge image;

a line image circuit configured to extract straight lines from the edge image, thereby obtaining line images;

a vanishing point setting circuit configured to determine extensions of the straight lines of the line images and set a vanishing point based at least in part on the extensions; and a trimming circuit configured to trim each original image of the plurality of original images so that a position of the vanishing point of each original image of the plurality of original images matches with a position of a vanishing point of each other original image of the plurality of original images, thereby obtaining a final image corresponding to each original image.

* * * * *